(12) United States Patent
Steedman et al.

(10) Patent No.: US 10,114,776 B2
(45) Date of Patent: Oct. 30, 2018

(54) SYSTEM ARBITER WITH PROGRAMMABLE PRIORITY LEVELS

(71) Applicant: Microchip Technology Incorporated, Chandler, AZ (US)

(72) Inventors: Sean Steedman, Phoenix, AZ (US); Kevin Kilzer, Chandler, AZ (US); Ashish Senapati, Tempe, AZ (US); Justin Milks, Tempe, AZ (US); Prashanth Pulipaka, Bangalore (IN)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/498,846

(22) Filed: Apr. 27, 2017

(65) Prior Publication Data

US 2018/0121380 A1    May 3, 2018

(30) Foreign Application Priority Data

Nov. 3, 2016 (IN) .............................. 201611037584

(51) Int. Cl.
| | |
|---|---|
| *G06F 13/36* | (2006.01) |
| *G06F 13/00* | (2006.01) |
| *G06F 13/362* | (2006.01) |
| *G06F 13/26* | (2006.01) |
| *G06F 13/28* | (2006.01) |
| *G06F 13/40* | (2006.01) |
| *G06F 13/34* | (2006.01) |

(52) U.S. Cl.
CPC ............ *G06F 13/362* (2013.01); *G06F 13/26* (2013.01); *G06F 13/28* (2013.01); *G06F 13/34* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 5,528,767 A | * | 6/1996 | Chen ..................... | G06F 13/364 370/462 |
| 5,884,051 A | * | 3/1999 | Schaffer ................ | G06F 13/364 710/107 |
| 8,984,198 B2 | * | 3/2015 | Catherwood ......... | G06F 13/362 710/116 |

(Continued)

OTHER PUBLICATIONS

International Search Report and Written Opinion, Application No. PCT/US2017/059848, 11 pages, dated Jan. 22, 2018.

*Primary Examiner* — Michael Sun
(74) *Attorney, Agent, or Firm* — Slayden Grubert Beard PLLC

(57) ABSTRACT

A programmable system arbiter for granting access to a system bus among a plurality of arbiter clients and a central processing unit is disclosed. The programmable system arbiter may include one or more interrupt priority registers, each of the one or more interrupt priority registers associated with an interrupt type; and system arbitration logic operable to arbitrate access to the system bus among the plurality of arbiter clients and the CPU based at least on an analysis of a programmed priority order, the programmed priority order comprising a priority order for each of the plurality of arbiter clients, each of a plurality of operating modes of the central processing unit, and each of the one or more interrupt types.

20 Claims, 2 Drawing Sheets

(56) References Cited

U.S. PATENT DOCUMENTS

2002/0112107 A1\* 8/2002 Joffrain ............... G06F 13/26
710/264
2008/0147907 A1 6/2008 Triece et al. ............... 710/22

\* cited by examiner

SYSTEM ARBITER WITH PROGRAMMABLE PRIORITY LEVELS

RELATED PATENT APPLICATION

This application claims priority to Indian Patent Application No. 201611037584 filed Nov. 3, 2016, which is hereby incorporated by reference herein for all purposes.

TECHNICAL FIELD

The present disclosure relates to system arbitration, in particular to a system arbiter with programmable priority levels.

BACKGROUND

Embedded controllers comprise a central processing unit (CPU), memory and a plurality of peripheral devices to form a single chip system or a single chip microcontroller. Certain existing system arbitration schemes for embedded controllers are distributed among the various components of the embedded controllers, thus making changes to the overall system difficult and requiring difficulty in changing system priority order.

SUMMARY

There exists a need to provide a system arbitration scheme with programmable priority levels that allows for greater flexibility and scalability, as well as backward-compatibility with certain known embedded components. According to various embodiments, a programmable system arbiter, embedded controller, and method for granting access to a system bus among a plurality of arbiter clients and a central processing unit are disclosed.

According to various embodiments, an embedded controller is disclosed. The embedded controller may include: a system bus, a central processing unit ("CPU"), a plurality of arbiter clients, and a programmable system arbiter. The CPU may be communicatively coupled to the system bus. The CPU may also include a CPU priority register, and be operable to access the system according to a plurality of operating modes. The plurality of arbiter clients may be communicatively coupled to the system bus. Each of the plurality of arbiter clients may include a programmable priority register. The programmable system arbiter may be operable to grant access to the system bus among the plurality of arbiter clients and the central processing unit. The programmable system arbiter may be communicatively coupled to the plurality of arbiter clients and the system bus and the central processing unit. The programmable system arbiter may include one or more interrupt priority registers, each of the one or more interrupt priority registers associated with an interrupt type. The programmable system arbiter may be operable to arbitrate access to the system bus among the plurality of arbiter clients and the CPU based at least on an analysis of a programmed priority order, the programmed priority order comprising a priority order for each of the plurality of arbiter clients, each of the plurality of operating modes, and each of the one or more interrupt types.

In some embodiments, the plurality of operating modes includes a stall mode. The plurality of operating modes may also include a steal mode. In some embodiments, the plurality of arbiter clients comprises a direct memory access ("DMA") channel. In the same or alternative embodiments, the programmable system arbiter may be further operable to protect the programmed priority order based at least on a LOCK/UNLOCK mechanism. In some embodiments, the programmable system arbiter may further include a hard-coded priority table backup.

In some embodiments, the programmed priority order may be programmed in the programmable system arbiter during initialization of the embedded controller. In some embodiments, the programmed priority order may be programmed in the programmable system arbiter during execution of program instructions stored in memory.

According to various embodiments, a programmable system arbiter for granting access to a system bus among a plurality of arbiter clients and a central processing unit is disclosed. The programmable system arbiter may include: one or more interrupt priority registers, each of the one or more interrupt priority registers associated with an interrupt type; and system arbitration logic operable to arbitrate access to the system bus among the plurality of arbiter clients and the CPU based at least on an analysis of a programmed priority order, the programmed priority order comprising a priority order for each of the plurality of arbiter clients, each of a plurality of operating modes of the central processing unit, and each of the one or more interrupt types.

In some embodiments, the plurality of operating modes includes a stall mode. The plurality of operating modes may also include a steal mode. In some embodiments, the plurality of arbiter clients comprises a direct memory access ("DMA") channel. In the same or alternative embodiments, the programmable system arbiter may be further operable to protect the programmed priority order based at least on a LOCK/UNLOCK mechanism. In some embodiments, the programmable system arbiter may further include a hard-coded priority table backup.

In some embodiments, the programmed priority order may be programmed in the programmable system arbiter during initialization of the embedded controller. In some embodiments, the programmed priority order may be programmed in the programmable system arbiter during execution of program instructions stored in memory.

According to various embodiments, a method for providing system arbitration for an embedded controller comprising a system bus, a central processing unit, a plurality of arbiter clients, and a programmable system arbiter is disclosed. The method may include: programming a priority level into a programmable priority register of an arbiter client for each of the plurality of arbiter clients, programming a priority level into a central processing unit priority register of a central processing unit for each of a plurality of operating modes of the central processing unit, programming a priority level into an interrupt priority register of the programmable system arbiter for each of a one or more interrupt types. And programming a programmed priority order comprising a priority order for each of the plurality of arbiter clients, each of the plurality of operating modes, and each of the one or more interrupt types. In some embodiments, the method may also include protecting the programmed priority order based at least on a LOCK/UNLOCK mechanism.

In some embodiments, the programmed priority order may be programmed in the programmable system arbiter during initialization of the embedded controller. In some embodiments, the programmed priority order may be programmed in the programmable system arbiter during execution of program instructions stored in memory.

DETAILED DESCRIPTION

There exists a need to provide a programmable system arbiter that may handle various operating cases where a plurality of arbiter clients may change the priority of central processing unit ("CPU") execution based on the mode of operation. Further, there exists a need to provide such a programmable system arbiter that is backwards-compatible with certain microcontroller modules. For example, Microchip Technology provides a certain module, NVMSCANNER, which may require such backward compatibility.

Figure 1:
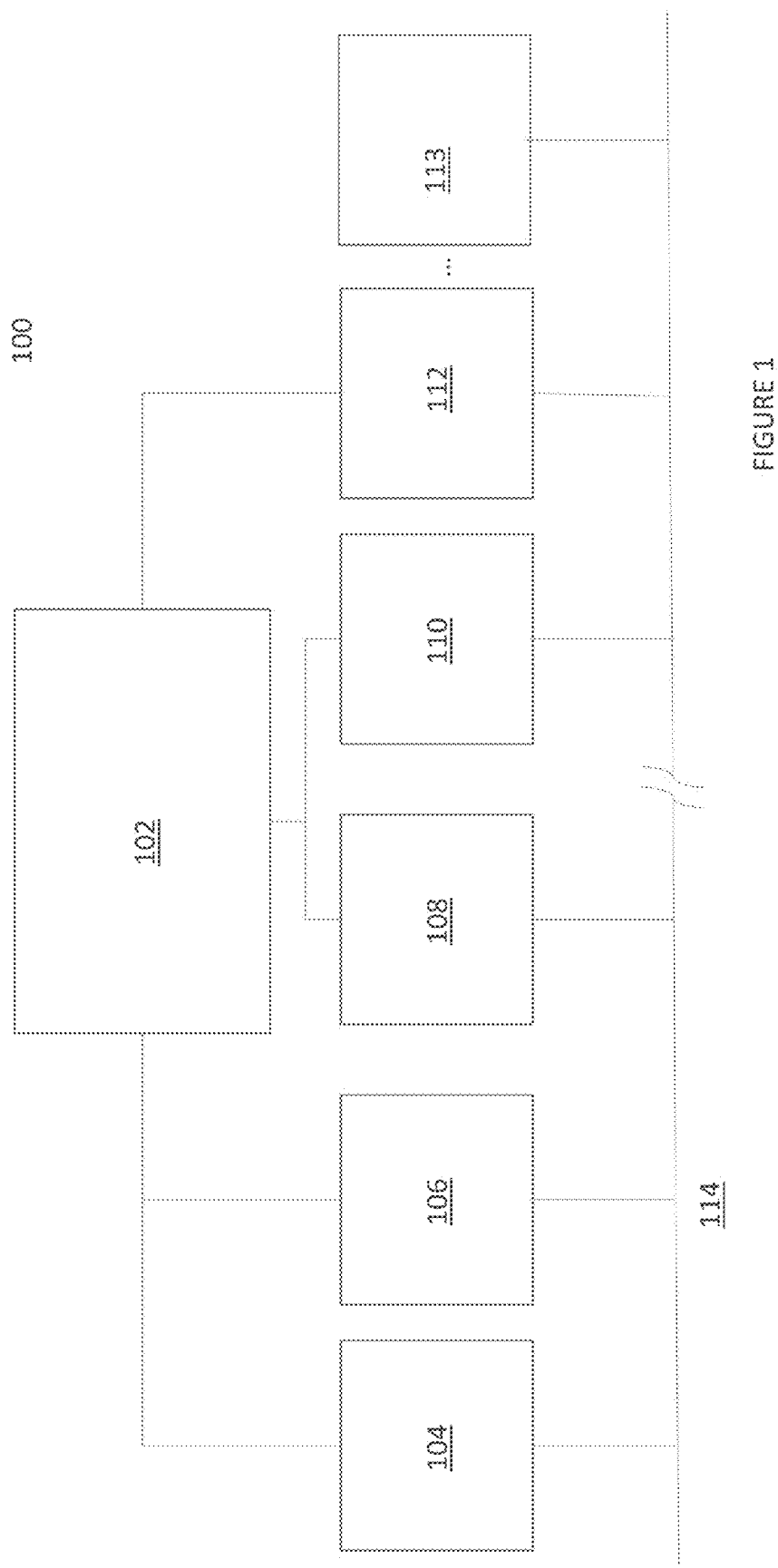
FIG. 1 illustrates an example embedded controller for providing programmable priority levels in system arbitration, in accordance with certain embodiments of the present disclosure.

FIG. 1 illustrates an example embedded controller 100 for providing programmable priority levels in system arbitration, in accordance with certain embodiments of the present disclosure. In some embodiments, embedded controller 100 may include programmable system arbiter 102 communicatively coupled to central processing unit ("CPU") 104 and arbiter clients 106, 108, 110, 112. CPU 104 and arbiter clients 106, 108, 110 are communicatively coupled to system bus 114. In some embodiments, embedded controller 100 may be any appropriate embedded electronic system, such as a microcontroller system. In some embodiments, system bus 114 may be any appropriate electronic communication path communicatively coupled to CPU 104 and arbiter clients 106, 108, 110, 112. For example, system bus 114 may be a memory bus that may provide access to one or more nonvolatile memory components of embedded controller 100. In some embodiments, arbiter clients 106, 108, 110, 112 may be any appropriate electronic peripheral to embedded controller 100. For example, arbiter clients 106, 108, 110, 112, 113 may be a plurality of direct memory access ("DMA") channels. Although FIG. 1 illustrates five arbiter clients 106, 108, 110, 112, 113, more, fewer, and/or different arbiter clients may be present within any particular configuration without departing from the scope of the present disclosure.

In certain known embedded controllers, a peripheral has a built-in priority relative to CPU execution. Examples of such peripherals include NVMSCANNER. Thus, in such known controllers, system arbitration was distributed, making changes to system priority difficult. Further, as new peripherals (e.g., DMA channels) were added to such known controllers, it became desirous to centralize system arbitration.

In certain embodiments of the present disclosure, an embedded controller may determine arbitration priority in order for the programmable system arbiter to properly resolve task execution. This may involve, for example, handling legacy peripherals that may change system priority based on a selected mode of operation. For example, the NVMSCANNER peripheral has the capability to change system priority based on whether it is operating in a "STALL" mode (e.g., halting the CPU), a "STEAL" mode (e.g., accessing the system bus without affecting the CPU), or an interrupt mode. Other peripherals provide additional requirements. For example, a DMA channel may have the capability to STALL or STEAL, as well as altering performance based on interrupts.

In some embodiments, each arbiter client, each CPU, and each interrupt type has a priority register. For example, each arbiter client include a programmable priority register, each CPU a CPU priority register, and each interrupt type an interrupt priority register. Each component's priority register may be programmed to include a priority level. The priority level may be based, among other things, on the type of component, mode of operation, etc. The collection of priority levels may then be programmed into the programmable system arbiter 102 as a programmed priority order. Table 1 below illustrates an example programmed priority order. The programmed priority order allows embedded controller 100 to arbitrate access to system bus 114 according to the programmed priority order.

In some embodiments, programmable system arbiter 102 and CPU 104 may include one or more interrupt priority registers. Each of the one or more interrupt priority registers may be associated with a different interrupt type (e.g., a "high" interrupt or "low" interrupt) as well as an execution level in which no interrupt service routine is executed. In some embodiments, CPU 104 may handle all three execution levels (e.g., a high interrupt, a low interrupt, and no interrupt) separately. In the same or alternative embodiments, programmable system arbiter 102 may handle all three execution levels (e.g., a high interrupt, a low interrupt, and no interrupt) together, as described in more detail below.

In the same or alternative embodiments, programmable system arbiter 102 may also include system arbitration logic operable to arbitrate access to system bus 114 among the plurality of arbiter clients 106, 108, 110, 112, 113 and CPU 104 based at least on an analysis of a programmed priority order, as described in more detail below. System arbitration logic may be any appropriate electronic component and/or collection of components operable to fulfill the functionality of a system arbitration module.

TABLE 1

| Priority Order | | Client STALL/STEAL | | |
|---|---|---|---|---|
| 1 | Arbiter Client 112 Request | STALL CPU | STALL CPU | STALL CPU |
| 2 | Execute First Interrupt Type | | | |
| 3 | Arbiter Client 108 Request | STALL CPU | STALL CPU | Request STEAL |
| 4 | Execute Second Interrupt Type | | | |
| 5 | Client 113 Request | STALL CPU | Request STEAL | Request STEAL |
| 6 | Client 106 Request | STALL CPU | Request STEAL | Request STEAL |
| 7 | Execute Main | | | |
| 8 | Client 108 Request | Request STEAL | Request STEAL | Request STEAL |

In the example programmable priority order of TABLE 1, each arbiter client 106, 108, 110, 112, 113 has a programmable priority order (programmed at the respective priority register for each client) as well as associated modes of operation associated with CPU 104 (e.g., STALL, STEAL). Further, each interrupt type has an associated programmable priority order (programmed at the respective priority register for each interrupt type). Examples of the interrupt types include Microchip Technology's "ISRH" and "ISRL." Still further, the "main" execution (e.g., the priority order associated with CPU 104 while not executing an interrupt service routine) has a programmable priority order (programmed at the CPU priority register).

In some embodiments, although the programmed priority order is programmable, priority changes may be protected. For example, priority changes may be protected by a "LOCK/UNLOCK" mechanism similar to the LOCK/UNLOCK mechanism used for nonvolatile memory operations. In the same or alternative embodiments, embedded controller 100 may also include a hardcoded priority table backup for cases where a user may assign duplicate priority.

Figure 2:
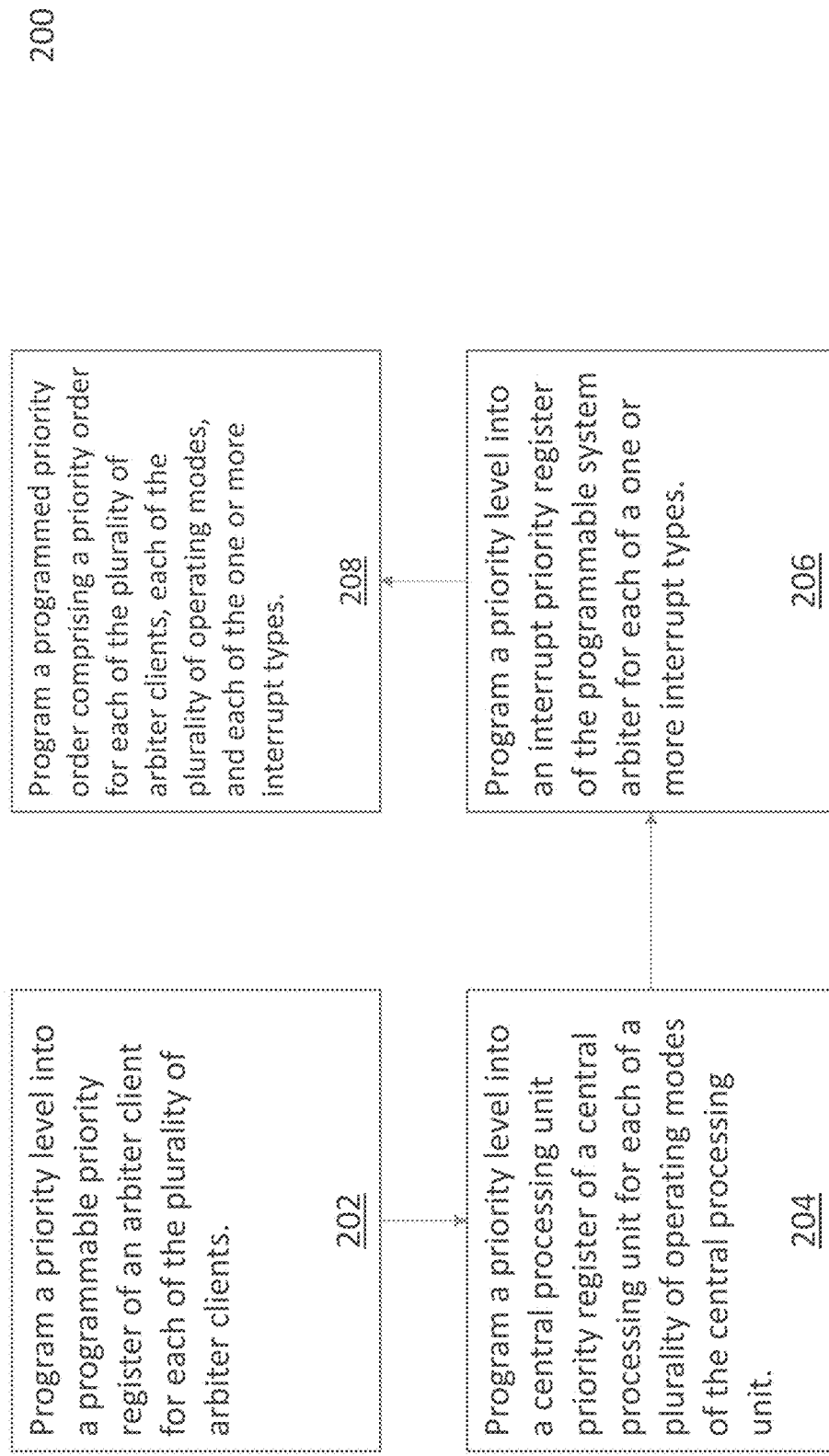
FIG. 2 illustrates an example flowchart of a method for providing a programmable system arbitration scheme, in accordance with certain embodiments of the present disclosure.

FIG. 2 illustrates an example flowchart of a method 200 for providing a programmable system arbitration scheme, in accordance with certain embodiments of the present disclosure. In some embodiments, method 200 includes 202-208. Although the example flowchart illustrates a method 200 beginning at 202, in some configurations, method 200 may begin at other appropriate points. For example, the order of 202, 204 may be switched.

In some embodiments, method 200 begins at 202. At 202, a user may program a priority level into a programmable priority register of an arbiter client for each of the plurality of arbiter clients. After programming the priority order for the plurality of arbiter clients, method 200 may continue to 204. At 204, a user may program a priority level into a CPU priority register of a CPU for each of a plurality of operating modes of the CPU. After programming the priority order for the CPU, method 200 may continue to 206. At 206, a user may program a priority level into an interrupt priority register of the programmable system arbiter for each of a one or more interrupt types. After programming the priority order for the interrupt types, method 200 may continue to 208. At 208, a user may program a programmed priority order comprising a priority order for each of the plurality of arbiter clients, each of the plurality of operating modes, and each of the one or more interrupt types. Once the programmed priority order is programmed, method 200 may proceed to any other appropriate point of method 200 when a change to priority order is desired. In the current disclosure, "user" and "program" may be understood to be the use of specialized software and/or hardware to program various components of embedded controller 100.

In various embodiments, an embedded controller, programmable system arbiter, and methods for providing system arbitration are disclosed. These various embodiments may allow a user greater flexibility in assigning resource priority based on system needs. For example, priority can be extended to sub-module performance (e.g., interrupt levels, module outputs, etc.). Further, priority may be set statically during initialization or dynamically during execution. Still further, the various embodiments may be scalable such that arbiter clients may be added and/or removed with diminished impact to the overall system. And still further, the various embodiments may provide backward-compatibility for certain known embedded components.

What is claimed is:

1. An embedded controller comprising:
    a system bus;
    a central processing unit ("CPU") communicatively coupled to the system bus, the central processing unit comprising a CPU priority register, and the central processing unit operable to access the system according to a plurality of operating modes;
    a plurality of arbiter clients communicatively coupled to the system bus, each of the plurality of arbiter clients comprising a programmable priority register; and
    a programmable system arbiter for granting access to the system bus among the plurality of arbiter clients and the central processing unit, the programmable system arbiter communicatively coupled to the plurality of arbiter clients and the system bus and the central processing unit, wherein:
    the programmable system arbiter comprises one or more interrupt priority registers, each of the one or more interrupt priority registers associated with an interrupt type; and
    the programmable system arbiter is operable to arbitrate access to the system bus among the plurality of arbiter clients and the CPU based at least on an analysis of a programmed priority order, the programmed priority order comprising a priority order for each of the plurality of arbiter clients, each of the plurality of operating modes, and each of the one or more interrupt types.

2. The embedded controller of claim 1, wherein the plurality of operating modes comprises a stall mode.

3. The embedded controller of claim 1, wherein the plurality of operating modes comprises a steal mode.

4. The embedded controller of claim 1, wherein the plurality of arbiter clients comprises a direct memory access ("DMA") channel.

5. The embedded controller of claim 1, wherein the programmable system arbiter is further operable to protect the programmed priority order based at least on a LOCK/UNLOCK mechanism.

6. The embedded controller of claim 1, wherein the programmable system arbiter further comprises a hardcoded priority table backup.

7. The embedded controller of claim 1, wherein the programmed priority order is programmed in the programmable system arbiter during initialization of the embedded controller.

8. The embedded controller of claim 1, wherein the programmed priority order is programmed in the programmable system arbiter during execution of program instructions stored in memory.

9. A programmable system arbiter for granting access to a system bus among a plurality of arbiter clients and a central processing unit, the programmable system arbiter comprising:
    one or more interrupt priority registers, each of the one or more interrupt priority registers associated with an interrupt type; and
    system arbitration logic operable to arbitrate access to the system bus among the plurality of arbiter clients and the CPU based at least on an analysis of a programmed priority order, the programmed priority order comprising a priority order for each of the plurality of arbiter clients, each of a plurality of operating modes of the central processing unit, and each of the one or more interrupt types.

10. The programmable system arbiter of claim 9, wherein the plurality of operating modes comprises a stall mode.

11. The programmable system arbiter of claim 9, wherein the plurality of operating modes comprises a steal mode.

12. The programmable system arbiter of claim 9, wherein the plurality of arbiter clients comprises a direct memory access ("DMA") channel.

13. The programmable system arbiter of claim 9, wherein the programmable system arbiter is further operable to protect the programmed priority order based at least on a LOCK/UNLOCK mechanism.

14. The programmable system arbiter of claim 9, wherein the programmable system arbiter further comprises a hardcoded priority table backup.

15. The programmable system arbiter of claim 9, wherein the programmed priority order is programmed in the programmable system arbiter during initialization of the embedded controller.

16. The programmable system arbiter of claim 9, wherein the programmed priority order is programmed in the programmable system arbiter during execution of program instructions stored in memory.

17. A method for providing system arbitration for an embedded controller comprising a system bus, a central processing unit, a plurality of arbiter clients, and a programmable system arbiter, the method comprising:
   programming a priority level into a programmable priority register of an arbiter client for each of the plurality of arbiter clients;
   programming a priority level into a central processing unit priority register of a central processing unit for each of a plurality of operating modes of the central processing unit;
   programming a priority level into an interrupt priority register of the programmable system arbiter for each of a one or more interrupt types; and
   programming a programmed priority order comprising a priority order for each of the plurality of arbiter clients, each of the plurality of operating modes, and each of the one or more interrupt types.

18. The method of claim 17, further comprising protecting the programmed priority order based at least on a LOCK/UNLOCK mechanism.

19. The method of claim 17, wherein the programmed priority order is programmed in the programmable system arbiter during initialization of the embedded controller.

20. The method of claim 17, wherein the programmed priority order is programmed in the programmable system arbiter during execution of program instructions stored in memory.

* * * * *